United States Patent
Kim et al.

(10) Patent No.: US 8,738,091 B2
(45) Date of Patent: *May 27, 2014

(54) APPARATUS AND METHOD FOR MANAGING DATA IN PORTABLE TERMINAL

(71) Applicant: Samsung Electronics Co., Ltd, Gyeonggi-do (KR)

(72) Inventors: Jung-Nyun Kim, Gyeonggi-do (KR); Young-Jip Kim, Gyeonggi-do (KR); Jin-Woo Jeon, Gyeonggi-do (KR); Chang-Hyeon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,029

(22) Filed: Jan. 11, 2013

(65) Prior Publication Data
US 2013/0122966 A1 May 16, 2013

Related U.S. Application Data

(63) Continuation of application No. 12/657,075, filed on Jan. 13, 2010, now Pat. No. 8,364,135.

(30) Foreign Application Priority Data

Jan. 13, 2009 (KR) ........................ 10-2009-0002622

(51) Int. Cl.
*H04M 1/02* (2006.01)
*G06F 17/30* (2006.01)

(52) U.S. Cl.
USPC ............................................ 455/566; 707/752

(58) Field of Classification Search
USPC .......... 455/457, 418, 456.1, 3.06, 414.1, 566; 709/217; 715/810; 707/752
See application file for complete search history.

(56) References Cited

U.S. PATENT DOCUMENTS

| | | | |
|---|---|---|---|
| 8,245,135 B2 * | 8/2012 | Cai et al. ........................ 715/254 |
| 2003/0129986 A1 * | 7/2003 | Blair et al. ...................... 455/450 |
| 2005/0101306 A1 * | 5/2005 | Zabawskyj et al. ......... 455/414.1 |
| 2007/0288454 A1 * | 12/2007 | Bolivar et al. ..................... 707/5 |
| 2007/0288514 A1 * | 12/2007 | Reitter et al. ............... 707/104.1 |
| 2008/0132252 A1 | 6/2008 | Altman et al. |
| 2008/0144094 A1 * | 6/2008 | Itoh et al. ..................... 358/1.15 |
| 2008/0305738 A1 | 12/2008 | Khedouri et al. |
| 2009/0088183 A1 | 4/2009 | Piersol et al. |
| 2009/0247151 A1 * | 10/2009 | Kameyama ................ 455/426.1 |
| 2010/0056076 A1 * | 3/2010 | Mazzara, Jr. ................. 455/90.1 |
| 2010/0279667 A1 * | 11/2010 | Wehrs et al. ............... 455/414.1 |

* cited by examiner

*Primary Examiner* — Melody Mehrpour (57) ABSTRACT

A portable terminal is capable of managing data. The portable terminal includes a controller, a display, a memory and a data management unit. The data management unit can sort pre-stored data in the memory as keyword-related data. The data management unit also can sort the pre-stored data depending on frequency of user's use, and outputting, to the display, the sorted data by layer.

21 Claims, 5 Drawing Sheets

APPARATUS AND METHOD FOR MANAGING DATA IN PORTABLE TERMINAL

CROSS-REFERENCE TO RELATED APPLICATION(S) AND CLAIM OF PRIORITY

The present application claims priority as a continuation of U.S. patent application Ser. No. 12/657,075 filed Jan. 13, 2010, entitled "APPARATUS AND METHOD FOR MANAGING DATA IN PORTABLE TERMINAL," which is related to and claims priority under 35 U.S.C. §119(a) of a Korean patent application filed in the Korean Intellectual Property Office on Jan. 13, 2009 and assigned Serial No. 10-2009-0002622. The content of the above-identified patent documents is hereby incorporated by reference.

TECHNICAL FIELD OF THE INVENTION

The present invention relates to an apparatus and method for a data management function of a portable terminal. More particularly, the present invention relates to a method and an apparatus, to provide a simple and convenient data management function to a user of a portable terminal, sorts and stores keyword-related data and, if a keyword input is sensed from the user, generating and outputting layers including the keyword-related data.

BACKGROUND OF THE INVENTION

Recently, portable terminals have experienced a sudden spreading of a use because of a convenience of portability. Thus, service providers (i.e., system manufacturers) are competitively developing portable terminals with more convenient functions to attract many users.

For example, the portable terminals are providing functions such as phonebooks, games, schedulers, Short Message Service (SMS), Multimedia Message Service (MMS), Broadcast Message Service (BMS), Internet service, electronic mail (e-mail), morning wakeup calls, MPEG-1 Audio Layer 3 (MP3) players, digital cameras, and the like.

Thus, a user of the portable terminal that includes the above functions stores data generated by using the functions. For example, the user of the portable terminal stores an image captured using a digital camera function or stores data for MP3 playing.

With an increase of an amount of the data, a method in which a user can search data stored in his/her own portable terminal should be provided, but general portable terminals search and manage data using a fixed interface such as a menu of a tree structure.

The above method is a method unsuitable for managing much data of a high-quality portable terminal, and a user has to select a menu one by one and manage corresponding data.

Also, a conventional portable terminal is configured to determine information on data itself (i.e., basic information of data name, capacity, and so forth) and thus does not provide information associated with corresponding data. Thus, there is a problem that a user has to determine and manage data piece by piece.

To provide a solution to the above problem, there is a need for an apparatus and method for providing a simple and convenient data management way to the user of the portable terminal.

SUMMARY OF THE INVENTION

To address the above-discussed deficiencies of the prior art, it is a primary aspect of the present invention to solve at least the above problems and/or disadvantages and to provide at least the advantages below. Accordingly, one aspect of the present invention is to provide an apparatus and method for improving a pre-stored data management performance in a portable terminal.

Another aspect of the present invention is to provide an apparatus and method for sorting and storing keyword-related data to enhance a data management performance in a portable terminal.

A further aspect of the present invention is to provide an apparatus and method for sorting keyword-related data and generating layers constituted of data of great frequency of user's use in a portable terminal.

A yet another aspect of the present invention is to provide an apparatus and method for controlling data included in a layer in a portable terminal.

The above aspects are achieved by providing an apparatus and method for managing data in a portable terminal.

In accordance with an aspect of the present invention, an apparatus for managing data in a portable terminal is provided. The apparatus includes a data management unit for sorting pre-stored data as keyword-related data, sorting the pre-stored data depending on frequency of user's use, and outputting the sorted data by layer.

In accordance with another aspect of the present invention, a method for managing data in a portable terminal is provided. The method includes sorting pre-stored data as keyword-related data, sorting the pre-stored data depending on frequency of user's use, and sorting and outputting the sorted data corresponding to frequency of user's use by layer.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5C, discussed below, and the various embodiments used to describe the principles of the present disclosure in this patent document are by way of illustration only and should not be construed in any way to limit the scope of the disclosure.

An apparatus and method to enhance a pre-stored data management performance, sorts and stores keyword-related data and generates layers constituted of data of great frequency of user's use among the keyword-related data in a portable terminal according to an exemplary embodiment of the present invention are described below. In the following description, the keyword-related data are defined as 'relational data'.

Figure 1:
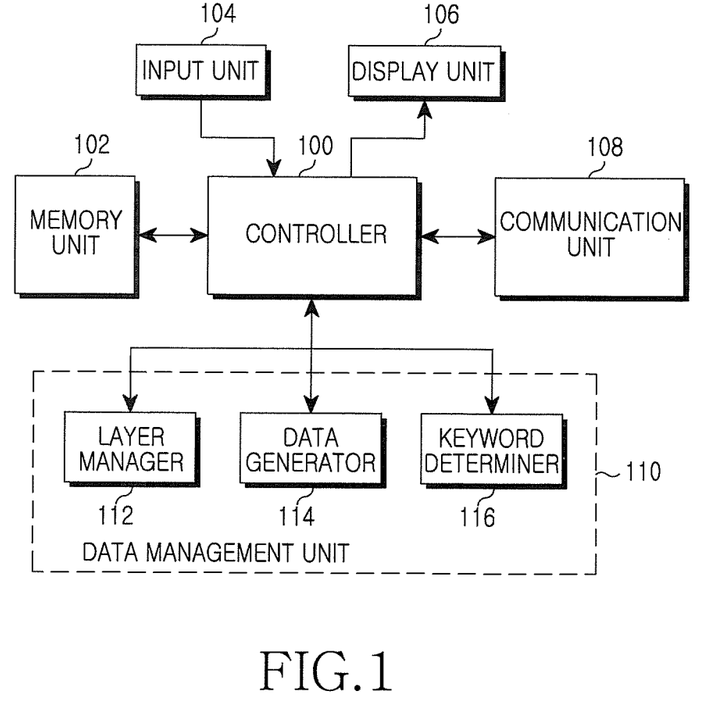
FIG. 1 illustrates a construction of a portable terminal for managing relational data according to an embodiment of the present invention.

FIG. 1 illustrates a construction of a portable terminal for managing relational data according to an exemplary embodiment of the present invention.

Referring to FIG. 1, the portable terminal may include a controller 100, a memory unit 102, an input unit 104, a display unit 106, a communication unit 108, and a data management unit 110. Here, the data management unit 110 can include a layer manager 112, a data generator 114, and a keyword determiner 116, and the like.

The controller 100 of the portable terminal controls a general operation of the portable terminal. For example, the controller 100 performs a process and control for voice telephony and data communication. In addition to a general function, the controller 100 sorts and stores relational data that represent data associated with keywords input by a user according to the present invention.

If an event of outputting relational data occurs, the controller 100 determines keywords, searches relational data relative to the keywords, and outputs the relational data to the display unit 106. At this time, the controller 100 generates and outputs layers constituted of relational data based on characteristics. For one example, the controller 100 determines the frequency of use of data used by a user and outputs the layers centering on a layer constituted of relational data frequently used.

The controller 100 of the portable terminal can process and control the data management unit 110 to perform the above operation. The data management unit 110 is described in detail herein below.

The memory unit 102 may include a Read Only Memory (ROM), a Random Access Memory (RAM), and a flash ROM. The ROM may store a microcode of a program for processing and controlling the controller 100 and the data management unit 110 and a variety of kinds of reference data.

The RAM may be a working memory of the controller 100 and temporarily stores data generated in execution of various programs. The flash ROM stores a diversity of kinds of updateable depository data such as a phonebook, an outgoing message, an incoming message, and information on a user touch input point, and stores relational data generated by the data management unit 110 according, to the present invention.

The input unit 104 may include numeral key buttons '0' to '9', a menu button, a cancel button, an OK button, a talk button, an end button, an Internet button, navigation key (or direction key) buttons, a plurality of function keys, such as a character input key and the like. The input unit 104 provides key input data corresponding to a key pressed by a user to the controller 100.

The display unit 106 displays state information generated during an operation of the portable terminal, characters of a limited number, a large amount of moving pictures and still pictures and the like. The display unit 110 can be a color Liquid Crystal Display (LCD). The display unit 106 includes a touch input device and, if being applied in a portable terminal using a touch input scheme, can be used as an input device.

The communication unit 108 transmits/receives and processes a wireless signal of data input/output through an antenna (not shown). For example, in a transmission mode, the communication unit 108 processes original data through channel coding and spreading, converts the original data into a Radio Frequency (RF) and transmits the RF signal. In a reception mode, the communication unit 108 converts a received RF signal into a baseband signal, processes the baseband signal through de-spreading and channel decoding, and restores the signal to original data.

Under control of the controller 100, the data management unit 110 generates relational data representing data associated with keywords, and outputs the generated relational data to the display unit 106.

The data management unit 110 is described below in detail. The data management unit 110 processes the keyword determiner 116 to determine keywords when a user's input or a specific event such as message reception occurs. At this time, if receiving a text message, the keyword determiner 116 can use as keywords all of words excepting postpositions in the content of the text message, and can use as keywords all of a text message sender, a message reception time, and a message title.

Thus, the data generator 114 of the data management unit 110 determines data relative to the keywords determined by the keyword determiner 116 and generates relational data corresponding to the keywords, thus making it possible for a user of the portable terminal to search for the relational data using the keywords.

The layer manager 112 determines the frequency of use of the relational data generated by the data generator 114 and sorts the relational data by frequency of use.

That is, the layer manager 112 generates a first layer that is a collection of only relational data frequently used by a user of the portable terminal, and generates a second layer including relational data of frequency of use less than those of the relational data included in the first layer. Namely, the layer manager 112 can generate a plurality of layers depending on frequency of user's uses and, to sort the layers, mark the layers with different colors, respectively. By this, the portable terminal can preferentially provide data of great frequency of use for the user.

For example, assuming that the portable terminal receives a text message of "Let's watch a movie and have a drink at Gangnam next Wednesday" from a person named 'Gil-Dong Hong', the data management unit 110 extracts a diversity of keywords.

The data management unit 110 determines the name of a sender of the above text message, extracts a 'Gil-Dong Hong' as a first keyword, and extracts a text message reception time as a second keyword.

After that, the data management unit 110 extracts, as keywords, words such as "movie", "drink", "Gangnam", "next", "Wednesday", and so forth, excepting postpositions and verbs in the content of the text message.

Thus, the data management unit 110 determines data existing within the portable terminal and generates relational data that represent data associated with the keywords.

That is, the data management unit 110 determines if the above keywords are associated with a user registered to a phonebook, and sorts relational data such as a group connected with the user, a bell sound, an address, and a birthday.

Also, on the basis of the keyword of 'Gil-Dong Hong' that is the name of the text message sender, the data management unit 110 determines a promise "fishing trip in 20 Oct. 2008" made with 'Gil-Dong Hong' and registered on a schedule. After that, the data management unit 110 extracts keywords from the "fishing trip in 20 Oct. 2008" and generates relational data corresponding to the keywords.

By determining data corresponding to all categories and generating relational data in the above way, the data management unit 110 can generate relational data corresponding to all keywords existing within the portable terminal.

Table 1 below shows items of keywords extractable in case of receiving the above text message.

TABLE 1

| Keywords | Content |
| --- | --- |
| Words included in message | Names of actually extracted keywords (noun-based data): "Gil-Dong Hong", "drink", "Gangnam", . . . |
| Generation time | Generation time of data or file using keywords: "6:00 PM, 1st August 2008" |
| Related user | User name relative to data or file using keywords: "friend" |
| File name | Name of data or file using keywords: "SMS" |
| Latest contact date | Latest contact date with user relative to data or file using keywords: "12:30 AM, 1st August 2008" |
| Connection information | Connection information relative to a user of data or file using keywords (phone number, address): "010-123-4567", "number of cases of reception: 4" |
| information on phonebook registration or non-registration | Phonebook registration or non-registration of user relative to data or file using keywords: "TRUE" |
| Upper program | Name of program for managing data or file using keywords: "Message" |
| Number of frequency of use | Number of frequency of accessing or reproducing data or file using keywords: "X" |
| Type of media data | Type of data of media file using keywords (mp4, mp3, k3g, etc.): "FALSE" |
| Details of media data | Content of parsing data of media metadata portion: "FALSE" |

A function of the data management unit 110 can be implemented by the controller 100 of the portable terminal. However, for description convenience, these are separately constructed and shown in the present invention as an example of a construction without limitation to the scope of the present invention. It will be understood by those skilled in the art that various modifications of construction can be made within the scope of the present invention. For example, it can be also constructed for the controller 100 to process all of these functions.

The above description is made for an apparatus for improving a pre-stored data management performance in a portable terminal according to the exemplary embodiment of the present invention. The following description is made for a method for improving a pre-stored data management performance in a portable terminal by sorting and storing keyword-related data and generating layers constituted of data of great frequency of user's use among the keyword-related data, using the apparatus according to the exemplary embodiment of the present invention.

Figure 2:
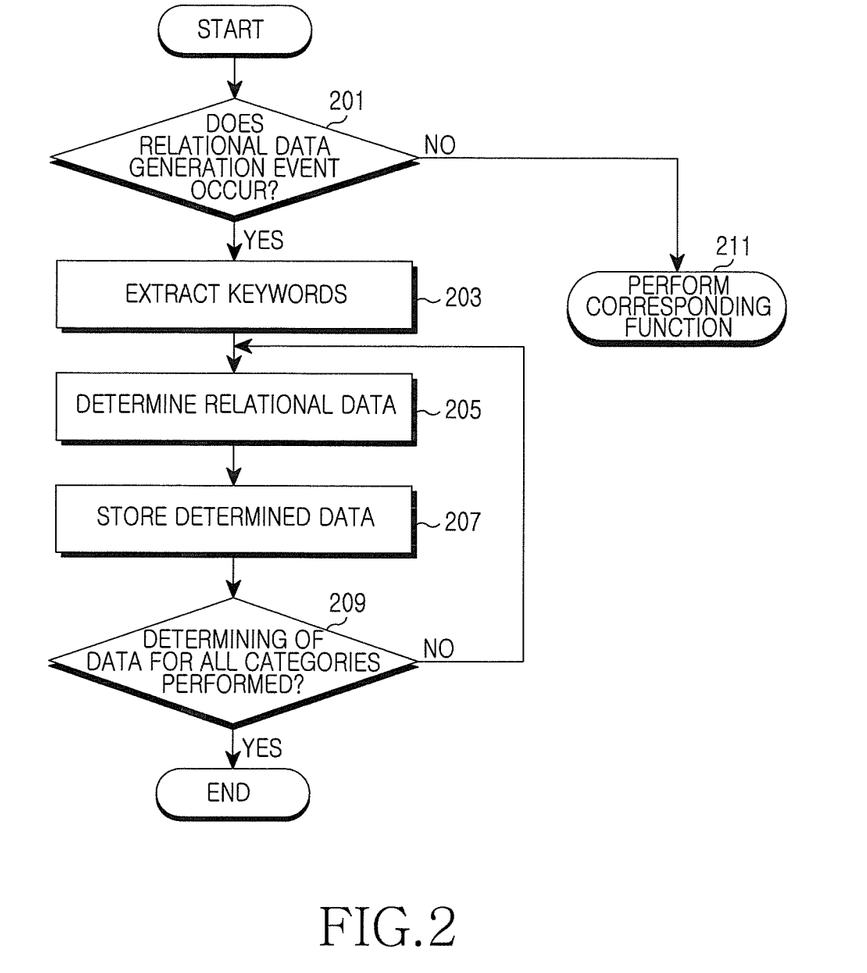
FIG. 2 illustrates a process of generating relational data in a portable terminal according to an embodiment of the present invention.

FIG. 2 illustrates a flowchart of a process of generating relational data in a portable terminal according to an exemplary embodiment of the present invention.

Referring to FIG. 2, the relational data represents data associated with a keyword of any one piece of data in the portable terminal. For instance, the relational data refers to data related to data 'Gil-Dong Hong' that is the name of a person in the portable terminal. Namely, the relational data refers to data associated with a keyword 'Gil-Dong Hong', such as a message sent by 'Gil-Dong Hong', a schedule with 'Gil-Dong Hong', a time of telephoning with 'Gil-Dong Hong', a picture captured along with 'Gil-Dong Hong', and so forth.

In step 201, the portable terminal for generating the relational data determines if an event of generating relational data occurs. Here, the relational data generation event is an event of determining a keyword for generating the relational data and can be, for one example, an event of receiving a message including the keyword.

If determining that the relational data generation event does not occur in step 201, the portable terminal proceeds to step 211 and performs a corresponding function (e.g., an idle mode).

Alternatively, if determining that the relational data generation event occurs in step 201, the portable terminal proceeds to step 203 and extracts keywords for relational data generation. For example, if receiving a message for relational data generation, the portable terminal can use, as keywords, a message sender and words excepting postpositions among the content of the message.

Then, in step 205, the portable terminal determines relational data and then, in step 207, stores the determined data. For example, if the portable terminal receives a text message from 'Gil-Dong Hong', the portable terminal can determine data relative to 'Gil-Dong Hong', e.g., an image stored in the name of 'Gil-Dong Hong', a phone number of 'Gil-Dong Hong', and a memo and schedule relative to 'Gil-Dong Hong', using a keyword 'Gil-Dong Hong'.

Then, the portable terminal proceeds to step 209 and determines if it performs the determining of the relational data for all categories. This process refers to a process of determining relational data such as a memo relative to a keyword, a phonebook, a message, and a picture for all categories, thus determining all relational data.

If not performing the determining of the relational data for the all categories in step 209, the portable terminal returns to step 205.

Alternatively, if performing the determining of the relational data for the all categories in step 209, the portable terminal terminates the process according to the exemplary embodiment of the present invention.

Figure 3:
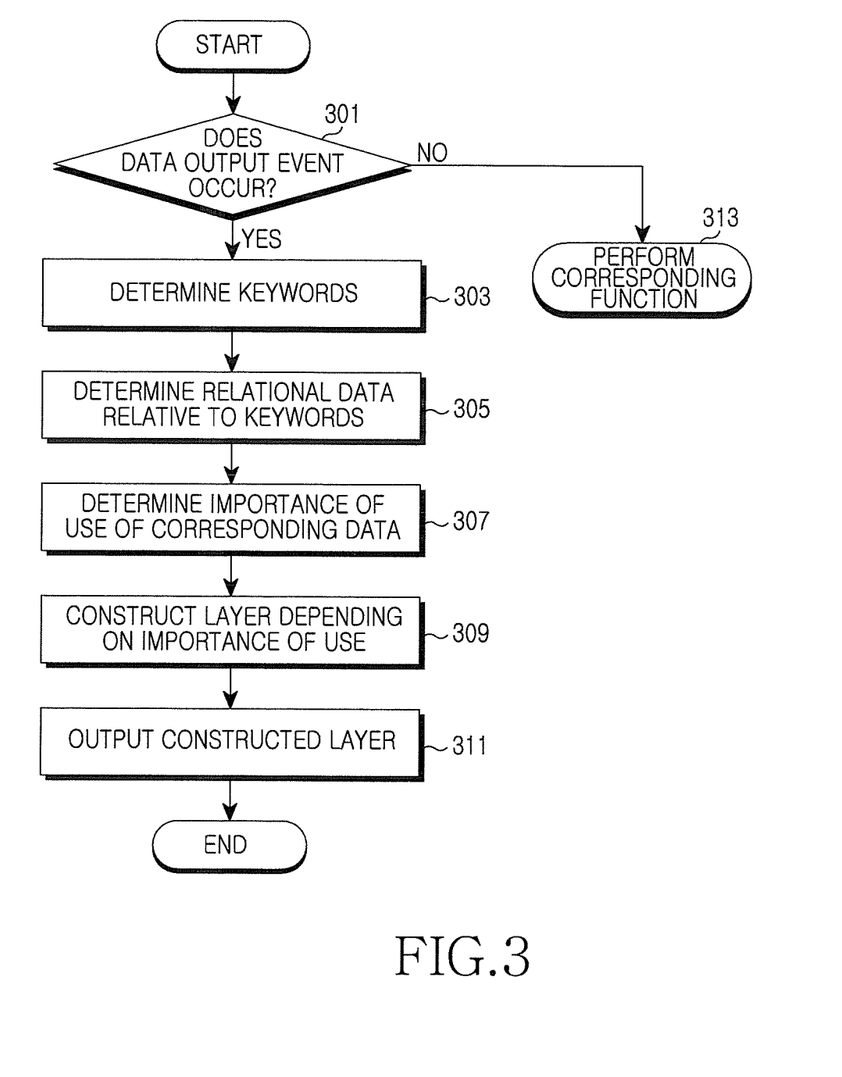
FIG. 3 illustrates a process of outputting relational data in a portable terminal according to an embodiment of the present invention.

FIG. 3 illustrates a flowchart of a process of outputting relational data in a portable terminal according to an exemplary embodiment of the present invention.

Referring to FIG. 3, in step 301, the portable terminal determines if an event of outputting data takes place. Here, the data output event, which is an event of outputting relational data corresponding to a keyword, refers to an event in which a user directly inputs a keyword or the portable terminal itself senses a keyword and outputs corresponding data.

If determining that the data output event does not take place in step 301, the portable terminal proceeds to step 313 and performs a corresponding function (e.g., an idle mode).

If determining that the data output event takes place in step 301, the portable terminal proceeds to step 303 and determines a keyword corresponding to relational data intended for output. Then, the portable terminal proceeds to step 305 and determines relational data corresponding to the keyword.

Then, in step 307, the portable terminal determines the frequency of user's use of the determined data and then, proceeds to step 309 and constructs a layer dependent on the determined frequency of user's use. Here, the frequency of user's use refers to the frequency of use of an application mainly used by a user of the portable terminal. The frequency of user's use is the great frequency of relational data corresponding to an application frequently used. The layer represents a layer that is constituted of a collection of the relational data.

Then, the portable terminal proceeds to step 311 and outputs the constituted layer to a display unit and then, terminates the process according to the exemplary embodiment of the present invention.

Figure 4A:
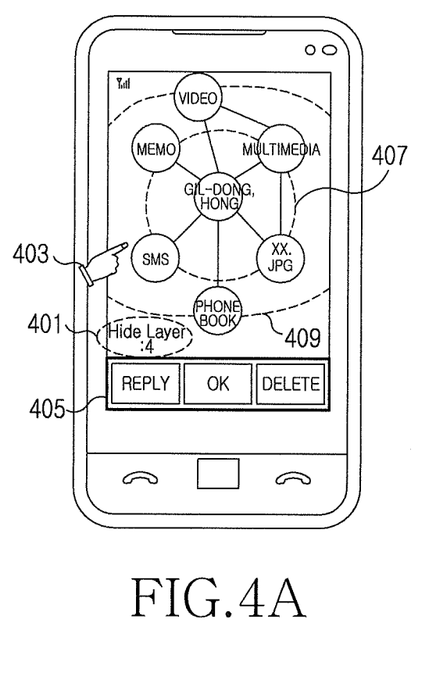
FIG. 4A illustrates a screen of a structure of relational data in a portable terminal according to an embodiment of the present invention.
Figure 4B:
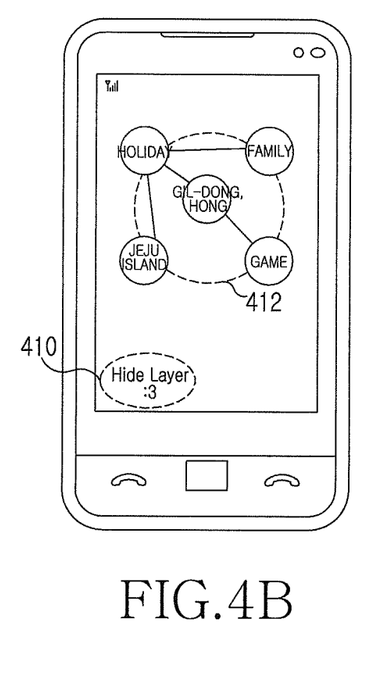
FIG. 4B illustrates a screen of a process of determining relational data in a portable terminal according to an embodiment of the present invention.

FIGS. 4A and 4B illustrate screens of outputting relational data in a portable terminal according to an exemplary embodiment of the present invention.

FIG. 4A illustrates a screen of a structure of relational data in a portable terminal according to an exemplary embodiment of the present invention.

In FIG. 4A, the portable terminal outputs relational data relative to a keyword centering on the keyword. At this time, the portable terminal generates and outputs layers of the relational data sorted depending on the frequency of user's use. For example, as indicated by reference numeral 407 in FIG. 4A, the portable terminal includes, in a first layer, four pieces of relational data such as a memo relative to a keyword 'Gil-Dona Hong', a Short Message Service (SMS), an 'XX.JPG' image, and a media file and outputs the relation data centering on a keyword 'Gil-Dong Hong'. The relational data included in the same layer are data of similar the frequency of user's use.

After that, the portable terminal includes, in a second layer, relational data corresponding to 'video' and 'phonebook' categories and outputs the relational data as indicated by reference numeral 409. The second layer 409 including the relational data corresponding to the 'video' and 'phonebook' categories is a layer including data of frequency of user's use less than that of the first layer 407 including the memo, the SMS, the 'XX.JPG' image, and the media file. Also, as indicated by reference numeral 401, the portable terminal can output, on a display unit, a content indicating that other layers including relational data relative to the keyword exist besides the layers being currently in output but are not currently in output. Namely, the portable terminal can output an indication of indicating that there are four lower layers other than the layers being currently in output as indicated by reference numeral 401.

The above structure is a basic structure of relational data according to the present invention. In the relational data, a user can control corresponding data using a drag-and-drop scheme. For example, if a user of the portable terminal selects an SMS among relational data that are already in output as indicated by reference numeral 403, the portable terminal outputs a menu of 'reply', 'OK', and 'delete' for the SMS as indicated by reference numeral 405. Thus, the user can drag and drop a corresponding icon onto the menu and simply and conveniently process a control of corresponding data.

FIG. 4B illustrates a screen of a process of determining relational data in a portable terminal according to an exemplary embodiment of the present invention.

In FIG. 4B, the portable terminal determines a keyword and outputs relational data as in FIG. 4A above.

Because there are four hidden layers other than relational data being currently in output in FIG. 4A, a user of the portable terminal can process to unhide the hidden layers or hide the unhidden layers by controlling a key (e.g., a volume key, and the like) for layer zoom-in/zoom-out.

If the user of the portable terminal controls the key for layer zoom-in, the portable terminal can output a layer of frequency of user's use less than those of the output layers of FIG. 4A as indicated by reference numeral 412 in FIG. 4B. Thus, as indicated by reference numeral 410, the portable terminal outputs information notifying that there are hidden layers (i.e., three layers) of frequency of user's use less than those of the layers being currently in output.

Figure 5A:
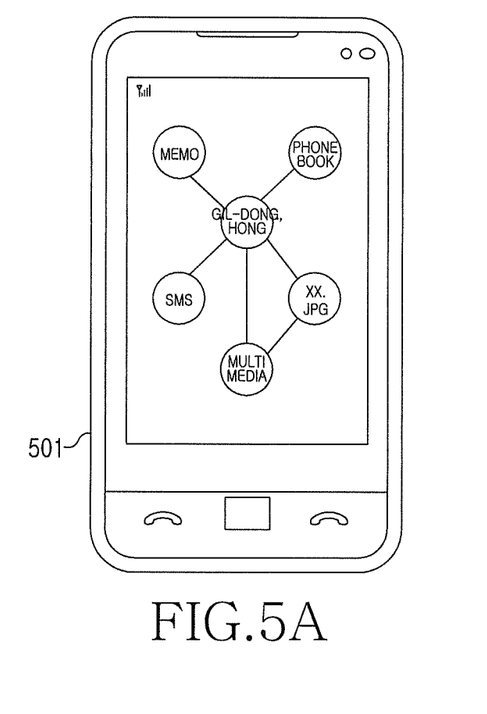
FIG. 5A illustrates a diagram of a screen of outputting relational data in a portable terminal according to an embodiment of the present invention.
Figure 5B:
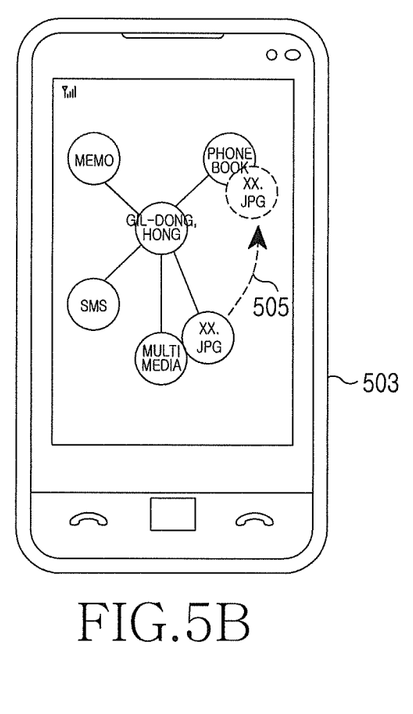
FIG. 5B illustrates a screen of a process of combining relational data in a portable terminal according to an embodiment of the present invention.
Figure 5C:
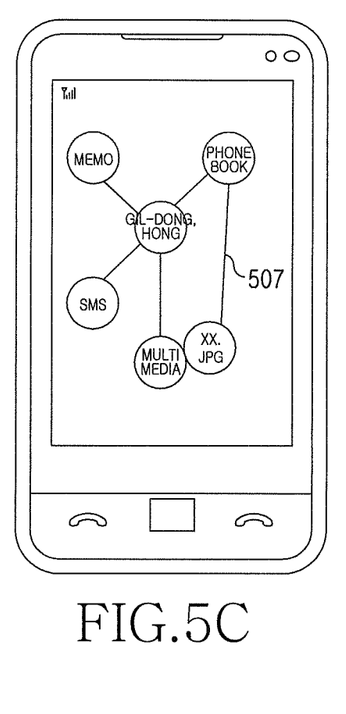
FIG. 5C illustrates a diagram of a screen of outputting a combination of relational data in a portable terminal according to an embodiment of the present invention.

FIGS. 5A, 5B, and 5C are diagrams illustrating a process of controlling relational data in a portable terminal according to an exemplary embodiment of the present invention.

FIG. 5A illustrates a diagram of a screen of outputting relational data in a portable terminal according to an exemplary embodiment of the present invention.

In FIG. 5A, the portable terminal outputs relational data such as a memo relative to a keyword 'Gil-Dong Hong', an SMS, a phonebook, a multimedia, and an 'XX.JPG' image as indicated by reference numeral 501. At this time, in order to indicate that the multimedia and the 'XX.JPG' image are data associated in category or content with each other, the portable terminal connects and marks corresponding data with a line.

FIG. 5B illustrates a screen of a process of combining relational data in a portable terminal according to an exemplary embodiment of the present invention.

In FIG. 5B, the portable terminal determines if a request for data combination from a user occurs. Here, the data combination represents applying relational data output from the portable terminal to another relational data. For one example, the data combination represents combining image data with a phonebook to serve as a storage image of the phonebook or combining a message noted in a memo with an SMS to serve as the content of the SMS.

As illustrated in FIG. 5B, if a user of the portable terminal applies the 'XX.JPG' image among relational data being currently in output to the phonebook, the user clicks and drags a corresponding data icon to a phonebook icon to apply the 'XX.JPG' image to the phonebook as indicated by reference numeral 505.

FIG. 5C is a diagram illustrating a screen of outputting a combination of relational data in a portable terminal according to an exemplary embodiment of the present invention.

In FIG. 5C, if a user of the portable terminal applies the 'XX.JPG' image to the phonebook as in FIG. 5B, the portable terminal draw a line between the phonebook and the 'XX.JPG' image as indicated by reference numeral 507 to indicate that the 'XX.JPG' image is linked with the phonebook. Before completing the combining process, that is, after the user of the portable terminal drags the icon, the portable terminal outputs, on a display unit, a pop-up window for determining whether to combine corresponding relational data, thus allowing the user to finally determine whether to complete the data combination.

If it is impossible to combine data intended for combination, the portable terminal outputs information indicating that the data combination is impossible, on the display unit.

For instance, assuming that the user of the portable terminal intends to combine a multimedia file, one of relational data, with a phonebook but the portable terminal cannot apply the multimedia file to the phonebook, after sensing dragging an icon, the portable terminal outputs a content of indicating that a corresponding data combination is impossible.

As described above, an exemplary embodiment of the present invention can sort and store relational data to improve a pre-stored data management performance and generate layers constituted of data of great frequency of user's use among the relational data in a portable terminal, thereby solving an inconvenience of selecting and determining a plurality of pieces of data one by one at the time of data management in a conventional portable terminal, thus enabling performance of effective data management.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal for managing data, the terminal comprising:
controller configured to:
determine keyword-related data items corresponding to an input keyword; and
sort the stored keyword-related data items into a plurality of layers based on frequency of use of each of the keyword-related data items;
wherein key-related items in the plurality of layers comprises one or more of a memo, a short message service (SMS) message, an image, and media.

2. The terminal of claim 1, wherein the controller is further configured to: extract a plurality of keywords based on a specified event; for each of the keywords, determine at least one keyword-related data item corresponding to the keyword; and store the keyword-related data items.

3. The terminal of claim 1, wherein the controller is further configured to: generate a plurality of layers based on the sorted keyword-related data items such that each succeeding layer has a descending frequency of use, wherein each layer comprises one or more of the keyword-related data items; and output the layers in descending frequency of use order.

4. The terminal of claim 3, wherein the controller is further configured to: display at least one layer and hide at least one layer; receive a key input for layer zoom-out/zoom-in; and hide at least one displayed layer and display at least one hidden layer based on the received key input.

5. The terminal of claim 1, wherein the controller is further configured to: display at least a subset of the keyword-related data items; and apply a first keyword-related data item to a second keyword-related data item in a drag-and-drop scheme.

6. The terminal of claim 1, wherein the controller is further configured to: display at least a subset of the keyword-related data items; receive a selection of one of the displayed keyword-related data items; and based on the selection, output a menu configured to control the selected keyword-related data item.

7. The terminal of claim 1, wherein each layer is marked with a different color depending upon a frequency of use for the keyword-related data items in the layer.

8. A method for managing data in a portable terminal, the method comprising:
determining keyword-related data items corresponding to an input keyword;
Sorting, by a data management unit, keyword-related data items based on a frequency of use for each keyword-related data item;
sorting, by the data management unit, the keyword-related data items into a plurality of layers such that each succeeding layer has a descending frequency of use; and
outputting, by a display unit, the layers in descending frequency of use order;
wherein key-related items in the plurality of layers comprises one or more of a memo, a short message service message (SMS), an image, and media.

9. The method of claim 8, further comprising:
extracting a plurality of keywords based on a specified event;
for each of the keywords, determining at least one keyword-related data item corresponding to the keyword; and
storing the keyword-related data items.

10. The method of claim 8, wherein outputting the layers comprises displaying a first layer having a highest frequency of use in a center part of a display and displaying at least a second layer outwardly of the first layer.

11. The method of claim 8, further comprising:
displaying at least one layer and hiding at least one layer;
receiving a key input for layer zoom-out/zoom-in; and
hiding at least one displayed layer and displaying at least one hidden layer based on the received key input.

12. The method of claim 8, further comprising:
displaying at least a subset of the keyword-related data items; and
applying a first keyword-related data item to a second keyword-related data item in a drag-and-drop scheme.

13. The method of claim 8, further comprising:
displaying at least a subset of the keyword-related data items;
receiving a selection of one of the displayed keyword-related data items; and
based on the selection, outputting a menu configured to control the selected keyword-related data item.

14. The method of claim 8, further comprising marking each layer with a different color depending on a frequency of use for each of the keyword-related data items in the layer.

15. A portable terminal capable of managing data, the terminal comprising:
a controller;
a display unit coupled to the controller;
a memory coupled to the controller; and
the controller configured to:
determine keyword-related data items corresponding to an input keyword, and sort the determined keyword-related data items into a plurality of layers based on a frequency of use of each of the keyword-related data items;
wherein key-related items in the plurality of layers comprises one or more of a memo, a short message service message (SMS), an image, and media.

16. The terminal of claim 15, wherein the controller is further configured to:
extract a plurality of keywords based on a specified event;
for each of the keywords, determine at least one keyword-related data item corresponding to the keyword; and
store the keyword-related data items.

17. The terminal of claim 15, wherein the controller is further configured to:
generate the plurality of layers based on the sorted keyword-related data items such that each succeeding layer has a descending frequency of use, wherein each layer comprises one or more of the keyword-related data items; and
output the layers in descending frequency of use order.

18. The terminal of claim 17, wherein the controller is further configured to:
- display at least one layer and hide at least one layer;
- receive a key input for layer zoom-out/zoom-in; and
- hide at least one displayed layer and display at least one hidden layer based on the received key input.

19. The terminal of claim 15, wherein the controller is further configured to:
- display at least a subset of the keyword-related data items; and
- apply a first keyword-related data item to a second keyword-related data item in a drag-and-drop scheme.

20. The terminal of claim 15, wherein the controller is further configured to:
- display at least a subset of the keyword-related data items;
- receive a selection of one of the displayed keyword-related data items; and
- based on the selection, output a menu configured to control the selected keyword-related data item.

21. The terminal of claim 15, wherein each layer is marked with a different color depending upon a frequency of use for the keyword-related data items in the layer.

* * * * *